United States Patent [19]

Wykoff

[11] Patent Number: 4,738,786
[45] Date of Patent: Apr. 19, 1988

[54] PRESSURE FILTER ENCLOSURE

[75] Inventor: Richard H. Wykoff, Livonia, Mich.

[73] Assignee: AMSTED Industries Incorporated, Chicago, Ill.

[21] Appl. No.: 873,690

[22] Filed: Jun. 12, 1986

[51] Int. Cl.⁴ .................. B01D 29/24; B01D 29/30; B01D 29/42

[52] U.S. Cl. .................................. 210/769; 100/37; 100/130; 100/211; 210/770; 210/791; 210/808; 210/248; 210/416.1; 210/485; 210/492; 210/497.01

[58] Field of Search .............. 100/37, 122, 126, 130, 100/211, 298; 209/379, 380, 381, 409; 210/350, 351, 354, 355, 356, 358, 391, 394, 398, 402, 403, 407, 416.1, 485, 768, 769, 770, 771, 791, 808, 489, 492, 497.01, 248

[56] References Cited

U.S. PATENT DOCUMENTS 3,276,594 10/1966 Gwilliam ........................ 210/350
3,756,142  9/1973 Gwilliam ........................ 100/298 X
3,805,961  4/1974 Clark et al. .................... 100/211 X
4,246,122  1/1981 Keat ............................... 100/211 X
4,334,996  6/1982 Boad .................................. 210/350
4,622,144 11/1986 Janecek et al. .................... 210/351

Primary Examiner—Richard V. Fisher
Assistant Examiner—W. Gary Jones
Attorney, Agent, or Firm—Edward J. Brosius; Charles E. Bouton

[57] ABSTRACT

The present invention provides a filter apparatus having a filter vessel into which liquid to be filtered is inlet near the bottom of the vessel. The liquid rises in the vessel and is forced through a filter screen running the height of the vessel. After flowing through the filter screen, the filtered liquid enters an annular enclosure outside the filter screen. The filtered liquid rises in the enclosure to the height of a discharge outlet near the top of the enclosure wall. This assures the even depositing of solids filtered from the liquid along the entire height of the filter screen.

6 Claims, 3 Drawing Sheets

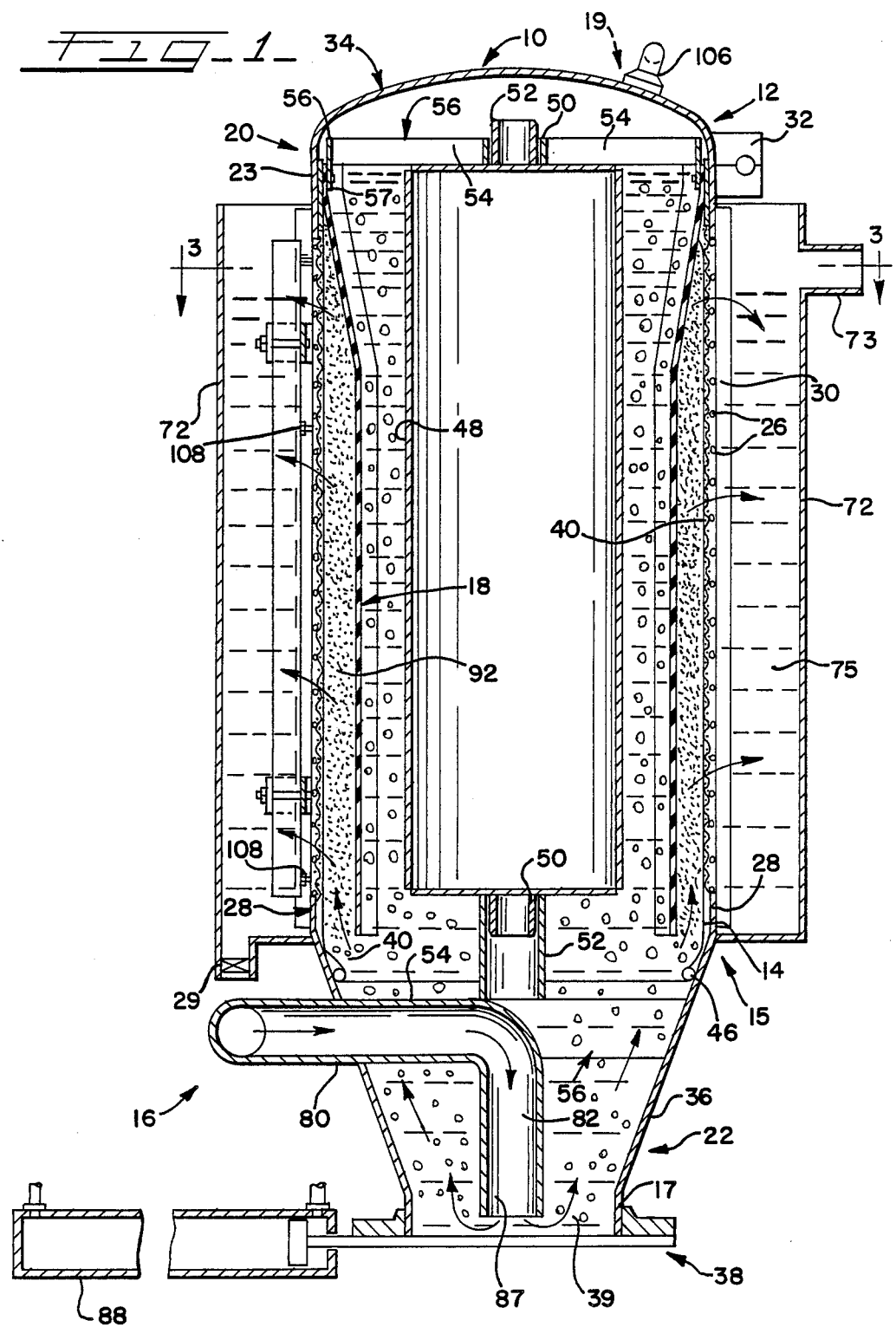

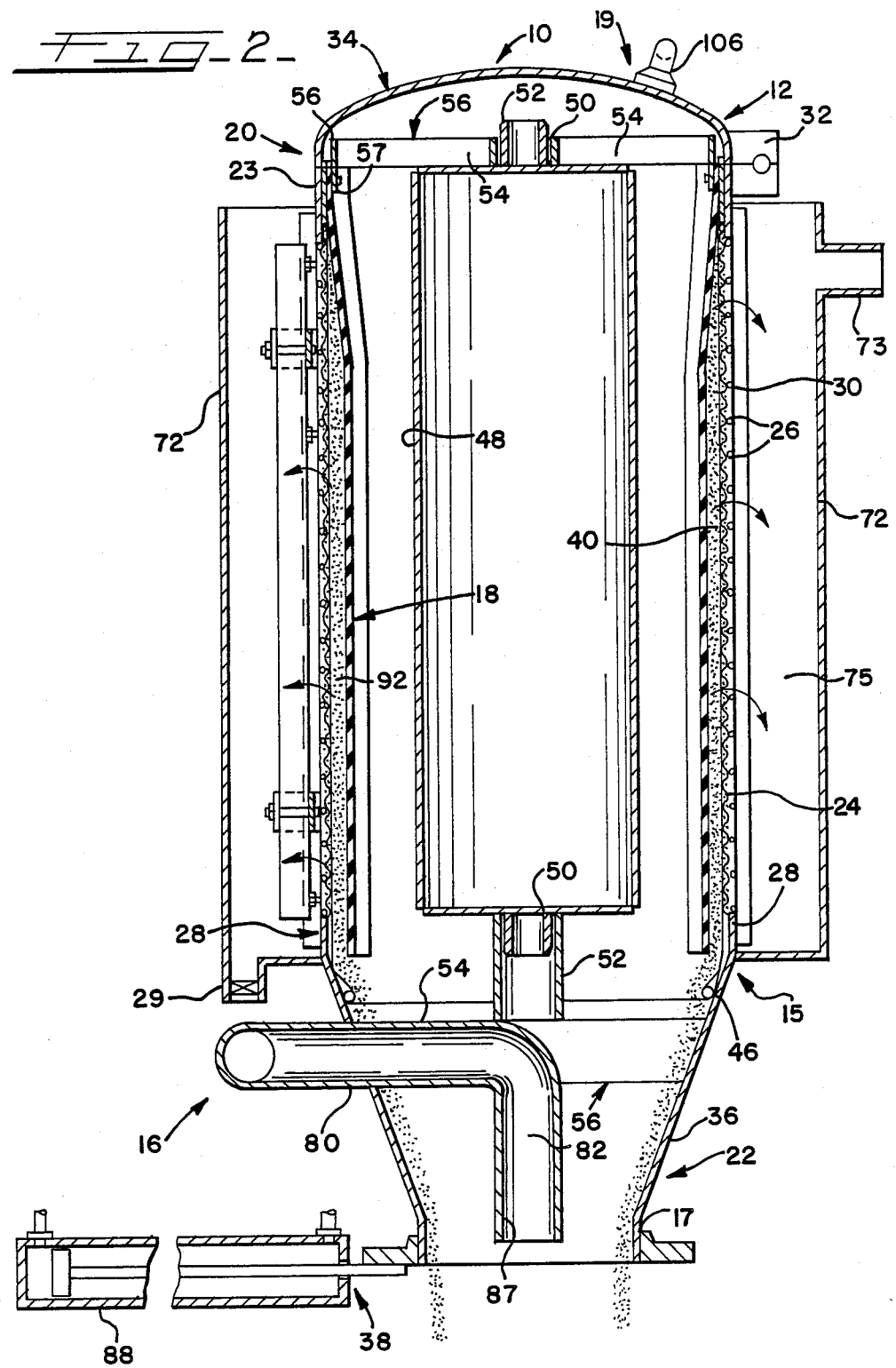

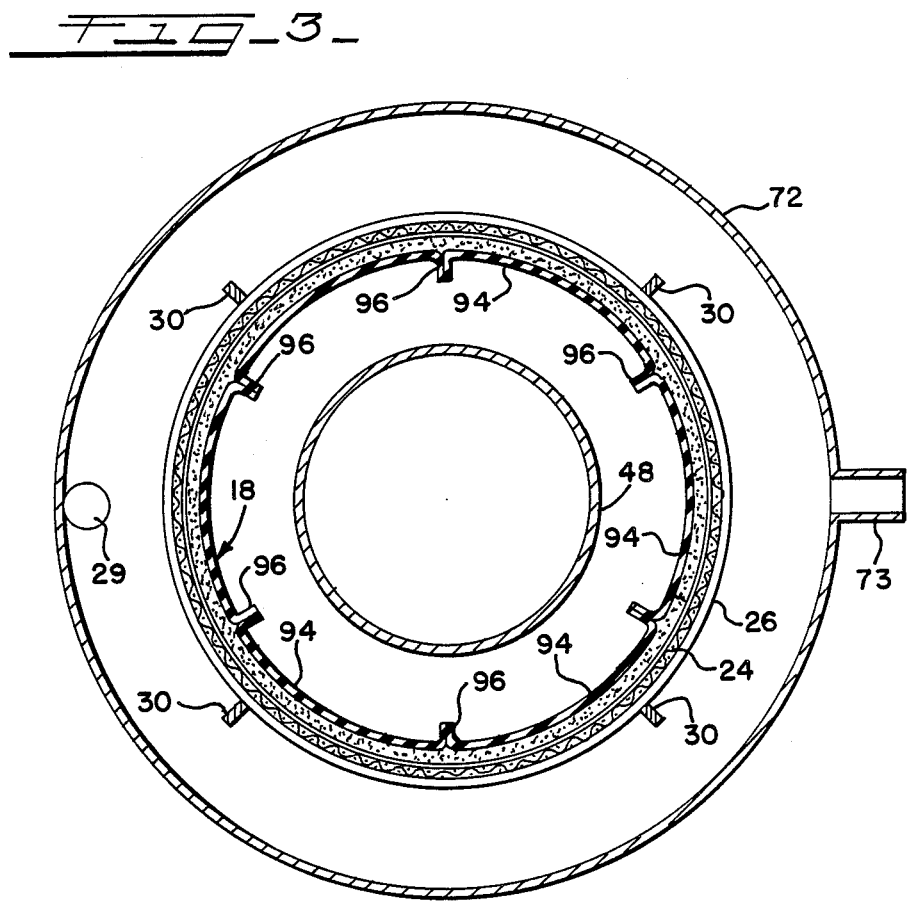
FIG_3_

PRESSURE FILTER ENCLOSURE

BACKGROUND OF THE INVENTION

The present invention relates to a filtration apparatus for separating suspended solids from a liquid suspension and more particularly, to a method and a filter apparatus having an enclosure around the filter screen with an elevated outlet to assure the even depositing of suspended solids from the liquid being filtered onto the filter screen.

This invention is related to the filter apparatus set forth in U.S. Pat. No. 4,622,144 assigned to the assignee of the present invention.

Such filters typically comprise a vertical cylindrical screen pressure vessel body lined with filter media. The filter media is sealed to the filter body above and below the screen section. When liquid to be filtered is pumped into the filter, the liquid flows through the filter media and screen section, leaving the dirt behind on the inner surface of the media. If the dirt load is free flowing and therefore causes little resistance to flow, a large amount of cake can accumulate in the lower portion of the filter. As the cake increases in thickness in the lower portion of the filter, resistance to flow increases so that the liquid level in the filter rises until it reaches the top of the filter and then a cake starts to accumulate at the top of the filter. The result is, for a freely-flowing dirt load, a cake that is very heavy at the bottom of the filter, tapering up to a very light cake at the top of the filter.

This shape of cake is undesirable for several reasons. One is that it interferes with the dewatering action of the membrane. Since the cake that the membrane is squeezing is tapered, the squeezing action is not uniform and the cake is likely to contain more moisture at the bottom than at the top.

In addition, a tapered cake is more difficult to break and discharge from the filter. A completely free-flowing cake may all accumulate at the bottom of the filter and completely disrupt the ability of the filter to discharge the cake.

In accordance with the present invention, a new and novel liquid suspension filtration method and apparatus are provided for removing suspended solids from liquid and depositing the solids on a filter media or wire screen through which the liquid suspension carrying the solids has passed.

This is accomplished generally by introducing a liquid suspension into a pressure vessel having a filter wall section on which the solids are deposited. The vessel is filled so that the entire surface area of the filter section is covered. As the liquid flows through the filter wall section, the suspended solid is deposited and accumulated thereon with the filtrate passing therethrough.

To assure the even depositing of suspended solids on the filter wall section, the vessel includes an enclosure wall outside the filter section forming an annular outlet chamber. The outlet chamber is in enclosed contact with the lower portion of the vessel, and includes an outlet near its upper portion. Accordingly, liquid passed through the filter section must rise in the outlet chamber to the outlet level before exiting the filter vessel. Accordingly, the solids accumulate on the filter section in an even manner and thickness. When such solids are of such a thickness that further filtration is no longer feasible, flow of liquid into the vessel is discontinued and pneumatic pressure means are actuated to create a pneumatic pressure within the vessel. This causes further flow of liquid through the accumulated solids on the filter section and gradually displaces the liquid suspension from the filter section to expose increasing areas of accumulated solid to the pneumatic pressure. The pneumatic pressure acting on the exposed solids is operative to compress or squeeze the solids against the filter section and remove additional liquid therefrom to form a layer in the nature of a cake. When the excess liquid is displaced from the filter section, the remaining liquid suspension is removed from the vessel and the pneumatic pressure is released. Thereafter the cake is removed from the septum and discharged from the vessel.

The above described arrangement is suitable for the extraction of liquids from suspended solids which are substantially air impervious when separated and deposited on the filter section. However, should the separated suspended solid not have the impervious characteristic, the arrangement of the present invention may be provided with a flexible fluid impervious curtain which overlies the filter section. The curtain is constructed and arranged so as to be spaced from the filter section to permit the passage of liquid through the latter. Upon the application of the pneumatic pressure to gradually displace the liquid from the filter section, the flexible curtain is forced into face to face engagement with the solids accumulated on the filter section by the pneumatic pressure acting thereon to compress the solids and extract liquid therefrom in substantially the same manner as described above.

DESCRIPTION OF THE DRAWINGS

In the drawings,

FIG. 1 is an elevational view partially in cross section of a filter apparatus embodying the structure of the present invention and showing the components thereof in an operating and filtering position;

FIG. 2 is an elevational view similar to FIG. 1 but showing the components in a position for extracting liquid from the suspension being filtered; and FIG. 3 is a fragmentary cross sectional view taken generally along the lines 3—3 of FIG. 1.

DESCRIPTION OF THE INVENTION

Referring to the drawings there is shown a filter apparatus 10 embodying the structure of the present invention. The filter apparatus comprises generally a vessel 12 having a porous filter section 14, a fluid inlet means 16 for introducing a liquid suspension into the vessel, a fluid impervious curtain 18 for compressing suspended solids S accumulated on the surface of the filter section 14, and pneumatic pressure means 19 for applying pressure forces on the liquid and to compress the solids against the filter section 14.

In the form shown, the vessel 12 is of generally cylindrical shape including an upstanding wall section 15 constructed to provide an outlet 17 for the suspended matter of the liquid suspension being filtered, a top section 20 and a bottom section 22. The vessel is constructed to withstand the higher than atmospheric pressures to which the vessel 12 is subjected during use as more fully explained hereinafter.

The wall section 15 includes an upper cylindrical end 23 having attached thereto the filter section 14. As shown, the filter section 14 includes a wire screen 24 which may be of a larger mesh than that required to perform the filtering function. The wire screen is attached to the end 23. A spiral wound rod 26 is fixed to the cylindrical upper end 23 and to lower cylindrical section 28. Fixed to the spiral rod 26 are a plurality of angularly spaced upright reinforcing bars 30 fixed also to the upper and lower cylindrical sections 23 and 28.

A cylindrical outer wall or enclosure 72 forms an annular chamber 75 outside of wire screen 24. Outer wall 72 is affixed to bottom section 22 of filter vessel 12, and includes an outlet 73 near the top portion of filter vessel 12 and at the top of wall 72. A discharge valve nozzle 29 is provided at the bottom of wall 72. Nozzle 29 is normally closed during filter operation, only opening to drain annular chamber 75.

Attached to the upper cylindrical end 23 by means of hinge 32 is a dome cover 34. The mating edges of the cover 34 and cylindrical end 23 may be sealed by a suitable sealing gasket (not shown).

The bottom or outlet section 22 may be in the shape of an inverted truncated cone 36 welded to the lower cylindrical section 28. A closure assembly such as a slide valve 38 is fixed to the cone 36 to selectively open and close the outlet or opening 17 through which the substantially liquid free solid or cake is discharged as more fully to be described hereinafter. The valve assembly 38 may be of conventional two-way solenoid or pneumatic two-way construction so that valve 38 is movable between an open (FIG. 2) and closed (FIG. 1) position over the opening 17.

In the embodiment shown, the filter section 14 includes a filter media sleeve 40 disposed along the interior of the vessel 12 to overlie the wire screen 24. It is to be understood, however, that in some applications of the filter apparatus 10, such media may not be used, but rather the mesh of the screen or the wall structure may be so modified that a separate filter media is not required. As shown, the filter media 40 is in the form of a tubular sleeve made from a porous material either woven or nonwoven. Such filter materials are well known in the art.

The lower end of the filter media sleeve 40, FIGS. 1 and 2, is provided with a seam which receives a hoop 46 of circular cross section. The hoop 46 serves to hold the filter media 40 in sealing engagement with the surface of the base 36 as shown.

The capacity of the vessel 12 may be decreased by a hollow sealed drum 48 to reduce the volume of pressurized air which is subsequently charged into the vessel as more fully to be explained hereafter. The drum 48 is coaxially disposed within the vessel by means of cylindrical shafts 50 fixed to the upper and lower ends thereof. The cylindrical shafts 50 seat within complementary open ended cylindrical supports or bosses 52.

The cylindrical bosses 52 are fixed to a circular strap 54 by means of radial legs 55 to form spiders 56. The upper one of the spiders 56 is seated on a hoop 57 and the lower spider 56 is removably seated in the truncated cone section 36. In this manner both the drum 48 and its associated spider support 56 may be removed from the vessel.

The fluid inlet arrangement as shown in FIGS. 1 and 2 includes a pump (not shown) and piping from a liquid suspension tank (not shown). The pump is connected to an inlet 80 to which is attached piping 82 extending into the base or truncated section 22 of the vessel 12.

The pipe opening 87 is directed downwardly toward the slide of a closure member such as a valve 38 which is movable between a normal closed position across the base opening 17 as shown in FIG. 1 and an open position as shown in FIG. 2. The slide valve 38 is actuated by a fluid actuated cylinder 88 connected to a suitable source of pressurized fluid.

In accordance with the present invention, the curtain 18 is loosely suspended from its upper end within the vessel 14 and has its lower end spaced from the side wall so as to provide an annular chamber 92 contiguous with the filter section into which the liquid suspension flows. The curtain 18 is made from a flexible fluid impervious material such as rubber or a plastic material.

As shown in FIG. 3, the curtain 18 may be a unitary structure formed as by molding or may be fabricated from a plurality of sheets 94 joined by seams 96.

The pneumatic pressure means 19 located on the upper section 20 includes compressed air nozzle 106 mounted on the cover 34. The nozzle 106 is connected by piping to a suitable source of compressed air (not shown). The compressed air source may be of the type conventionally used in manufacturing facilities and which is capable of delivering the desired pressure and volume. Typically such conventional types of air compresser delivers about 100 psi.

In operation, the liquid suspension is introduced into the vessel 12 by actuation of the pump (not shown) so as to cause flow of the liquid from the liquid suspension containing tank through piping 82 downwardly toward the closed slide valve 38.

Assuming the liquid suspension is of the type containing a solid which accumulates on the filter screen in a manner which is substantially impervious to air flow when of a significant thickness, the curtain 18 is removed prior to introducing the liquid suspension.

Liquid suspension is continuously introduced into the vessel whereupon the suspension is filtered through the filter section 14 and the solids are accumulated thereon. The filtered liquid flows through filter section 14 spilling into and filling enclosure 75. The level of filtered liquid rises in enclosure 75 until it reaches outlet 73 from which it is discharged. The solid accumulates on the filter section 14 in an even manner and thickness, and as the thickness of solid accumulates, the resistance to flow therethrough increases so that the suspension fills the vessel and the pressure increases. When the pressure, as detected by a pressure sensitive detector (not shown), is at a predetermined set point, further flow into the vessel is cut off.

The compressed air nozzle 106 is then opened to maintain the vessel charged with a pneumatic or air pressure higher than the above set point. This causes the liquid to continue to flow through the accumulated layer of solids on the filter section 14. As a result, the liquid level within the vessel drops so that the pressure compresses the solids that are exposed above the upper liquid level against the filter media 40 to further extract liquid therefrom. At the same time, the pneumatic pressure blowing therethrough the exposed solids serves also to create a drying effect on the accumulated solids. In this manner the accumulated solids are formed into a substantially liquid-free cake on the filter surface.

When the liquid level drops below the filter section 14, the valve 29 is opened to withdraw the remaining filtered liquid from enclosure 75. The remaining liquid to be filtered in bottom section 22 is withdrawn through piping 82 for return to the liquid suspension carrying tank. The slide valve 38 is then opened. The cake solids may be removed by cake breaker means such as pneumatic jets 108 radially spaced about the vessel, as shown, and/or other suitable cake breaking devices. The separated cake drops through the opening 39 into a hopper. To resume operation after the cake is removed, the slide valve 38 and the valve 85 are closed and an intake valve 83 opened so that the pump again feeds liquid suspension into the vessel for further filtration.

In the event that the suspended solid is not capable of providing substantial resistance to the flow of fluid through the filter section 14, the curtain 18 is installed prior to introducing the suspension. The liquid suspension is pumped into the vessel over the filter section 14 so that it may be filtered through the latter as shown in FIGS. 2 and 3. The suspended solid accumulates on the filter media 40 of the filter section 14 and the filtrate is collected in the trough 60 in the same manner as previously described. When the filtration pressure is at the set point or after a timed interval, the inlet valve is closed to shut off flow from the tank. The pneumatic means 106 are actuated to cause continued flow through the filter section and as the liquid level progressively drops, as heretofore described, the pneumatic forces are operative to cause pressure to be exerted on the exposed surface of the curtain above the liquid so that further liquid is squeezed from the accumulated layer of solids until the liquid level drops below the lower edge of the curtain.

At this time the compressed air flows upwardly into the space 92 occupied by the accumulated layer so that the air pressure within the chamber is released and the nozzles 106 may be closed. Valve 29 is opened to remove filtered liquid from enclosure 75. The outlet discharge is opened and the remaining liquid suspension in the vessel removed through the pipe 82 and branch 81 to return the suspension back to the tank.

After the liquid suspension is removed, the slide valve 38 is opened for discharge of the cake in the manner described above.

What is claimed is:

1. A pressure filtering apparatus comprising
    a filter vessel having top and bottom sections joined by a filter screen,
    means defining an inlet for liquid to be filtered in the bottom section of the filter vessel,
    a wall section located radially outward from the filter screen and having a bottom portion in sealing contact with the bottom section of the filter vessel,
    said filter screen being generally cylindrical of a first diameter, and the wall section generally cylindrical of a second diameter larger than the first diameter, such that an annular outlet chamber is formed between the filter screen and the wall section,
    a filter media inside said filter screen, said filter media having a top and bottom each sealed to the filter vessel and means for evenly depositing, along the height of the inside of the filter media, solids removed from the liquid being filtered comprising an outlet defined near a top portion of the wall section such that, upon the passing of the liquid to be filtered outwardly through the filter screen, the filtered liquid must rise upwardly in the outlet chamber to near the entire height of the filter screen before exiting through the outlet.

2. The filtering apparatus of claim 1 wherein the bottom portion of the wall section includes a drain to be opened in order to allow the wall section to be drained of filtered liquid after the flow of liquid to be filtered has been cut off and prior to the removal of solids filtered from the liquid to be filtered from the filter screen.

3. The filtering apparatus of claim 1 wherein a filter media is affixed adjacent and inside the filter screen.

4. The filtering apparatus of claim 3 wherein said filter media is generally cylindrical in shape and conforms to the inner surface of the filter screen.

5. A method of filtering comprising the steps of
    inletting a liquid to be filtered near the bottom of a filter vessel, providing a filter screen to form the walls of the vessel, providing a filter media inside the filter screen, said media having a top and bottom affixed to the filter vessel, forming an enclosure radially outward from the filter screen within the filter vessel, pressurizing the filter vessel to force said liquid to be filtered through the filter screen, the enclosure being in fluid tight connection with the bottom of the filter vessel and having an outlet near its upper surface such that the liquid, after passing through the filter screen, must rise to the level of the outlet before it exits the filter vessel, and solids removed from the liquid being filtered are generally evenly deposited along the height of the inside of the filter media.

6. The method of filtering of claim 5 wherein the filtered liquid forced through the filter screen is drained from a bottom outlet in the enclosure prior to the complete cessation of pressurization of the filter vessel whereupon the solids accumulated on the filter screen are broken away and discharged through an exit valve at the bottom of the filter vessel.

* * * * *